US011386721B2

(12) United States Patent
Russ et al.

(10) Patent No.: US 11,386,721 B2
(45) Date of Patent: Jul. 12, 2022

(54) SYSTEM FOR ANALYZING OPERATION OF A HAND-GUIDED WORKING APPARATUS AND METHOD FOR ANALYZING OPERATION OF A HAND-GUIDED WORKING APPARATUS

(71) Applicant: Andreas Stihl AG & Co. KG, Waiblingen (DE)

(72) Inventors: Patrick Russ, Stuttgart (DE); Tommy Roitsch, Waiblingen (DE); Friedrich Hollmeier, Rudersberg (DE); Claus Naegele, Stuttgart (DE); Michael Unterkircher, Uhingen (DE); Michael Gramm, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 508 days.

(21) Appl. No.: 16/366,385

(22) Filed: Mar. 27, 2019

(65) Prior Publication Data
US 2020/0126319 A1 Apr. 23, 2020

(30) Foreign Application Priority Data
Oct. 19, 2018 (DE) .................... 20 2018 105 999.8

(51) Int. Cl.
*G07C 3/12* (2006.01)
*G06V 20/40* (2022.01)
(52) U.S. Cl.
CPC .............. *G07C 3/12* (2013.01); *G06V 20/41* (2022.01)

(58) Field of Classification Search
CPC ............................. G07C 3/12; G06K 9/00718
See application file for complete search history.

(56) References Cited

U.S. PATENT DOCUMENTS

2014/0266765 A1* 9/2014 Neeley .................... G08B 5/00
340/691.6
2017/0120438 A1 5/2017 Kynast

FOREIGN PATENT DOCUMENTS

DE 10 2014 206 289 A1 10/2015
WO WO 2017/108937 A1 6/2017
WO WO 2018/075732 A1 4/2018

OTHER PUBLICATIONS

"Technical Information: STIHL MDG 1 Engine Analyzer—Series 5910", Andreas Stihl AG & Co. KG, 2011, pp. 1-6, (six (6) pages).

* cited by examiner

*Primary Examiner* — Mishawn N. Hunter
(74) *Attorney, Agent, or Firm* — Crowell & Moring LLP (57) ABSTRACT

A system for analysis of operation of a hand-guided working apparatus, wherein the working apparatus includes a working tool and a drive system for driving the working tool, includes an optical recording device configured for recording a temporal succession of images of a working procedure on a workpiece using the working tool, an identification device configured for identifying a temporal succession of operational data values of the drive system during recording of the temporal succession of images, and at least one output device configured for outputting in each case at least one of the recorded images together with at least one identified operational data value correlated in time thereto.

19 Claims, 7 Drawing Sheets

SYSTEM FOR ANALYZING OPERATION OF A HAND-GUIDED WORKING APPARATUS AND METHOD FOR ANALYZING OPERATION OF A HAND-GUIDED WORKING APPARATUS

CROSS REFERENCE TO RELATED APPLICATION

This application claims priority under 35 U.S.C. § 119 from German Patent Application No. 20 2018 105 999.8, filed Oct. 19, 2018, the entire disclosure of which is herein expressly incorporated by reference.

BACKGROUND AND SUMMARY OF THE INVENTION

The invention relates to a system for analyzing operation of a hand-guided working apparatus and to a method for analyzing operation of a hand-guided working apparatus.

The invention is based on the object of providing a system for analyzing operation of a hand-guided working apparatus and a method for analyzing operation of a hand-guided working apparatus.

The invention achieves this object by providing a system and a method according to the claimed invention.

The system, in particular electrical system, according to the invention for analyzing or evaluating operation or operating of a hand-guided working apparatus, in particular a gardening, forestry and/or construction working apparatus, wherein the working apparatus includes a working tool and a drive system, in particular a drive system activatable by a user in a variable manner, for driving, in particular for automatically driving, the working tool, comprises: an optical recording device, in particular an electrical optical recording device, an identification device, in particular an electrical identification device, and at least one output device, in particular an electrical and/or optical output device. The optical recording device is designed or configured for recording, in particular automatically recording, a temporal succession of images of a working procedure or working on a workpiece using the working tool. The identification device is designed or configured for identifying, in particular automatically identifying, a temporal succession of operational data values of the drive system during or at the same time as recording of the temporal succession of images. The at least one output device is designed or configured for outputting, in particular automatically and/or simultaneously and/or optically outputting, in each case at least one of the recorded images together with at least one operational data value identified in a manner correlated in time thereto or identified simultaneously or at the same time.

The system makes it possible for a user or an operator of the hand-guided working apparatus to analyze or evaluate the operation of the working apparatus, in particular for instruction and/or training. In detail, the system, in particular the recorded images in combination with the identified operational data values, make(s) it possible for the user to recognize an error by the user during operation or working and, in particular, to avoid said error during the next operation. In particular, the temporal succession of identified operational data values, in particular at least one non-optimum operational data value at an operation or working time, makes it possible for the user to notice non-optimum operation of the working apparatus, and the temporal succession of recorded images, in particular the image correlated in time to the non-optimum operational data value or recorded at the same time, makes it possible for the user to see non-optimum operation of the working apparatus and therefore to recognize the situation and/or the cause of non-optimum operation. The system therefore enables optimum, in particular ergonomic, operation of the working apparatus and/or an optimum operating state of the working apparatus and/or an optimum working result, in particular of the workpiece.

In particular, the workpiece can be referred to as a working object and/or a working article.

Additionally or alternatively, the hand-guided working apparatus may be a handheld working apparatus or a floor-guided working apparatus. In particular, a hand-guided, in particular handheld, working apparatus may mean that the working apparatus may have a maximum mass of 50 kilograms (kg), in particular 20 kg, in particular 10 kg. Additionally or alternatively, the drive system may have a maximum power of a minimum of 0.5 kilowatts (kW), in particular a minimum of 1 kW, in particular a minimum of 2 kW, in particular a minimum of 5 kW, and/or a maximum of 100 kW, in particular a maximum of 50 kW, in particular a maximum of 20 kW, in particular a maximum of 10 kW. Further additionally or alternatively, the working apparatus may have a user-activatable operating member for user activation, in particular variable, in particular continuously variable, user activation, of the drive system, in particular for variable, in particular continuously variable, power adjustment.

Further additionally or alternatively, the optical recording device may have or be a camera, in particular an electrical camera, in particular a digital camera and/or a video camera. Additionally or alternatively, the optical recording device may be designed to record at least twenty, in particular at least forty, in particular at least sixty, images per second. Further additionally or alternatively, the optical recording device may be designed to record the temporal succession of images of the working apparatus, in particular of the working tool, and/or of the workpiece and/or of the user, in particular during working. Further additionally or alternatively, the recording device may be separate, in particular spatially separate, from the working apparatus.

Further additionally or alternatively, the identification device may have at least one sensor, in particular an electrical sensor, wherein the at least one sensor can be designed to identify, in particular automatically identify, the temporal succession of operational data values of the drive system. Additionally or alternatively, the operational data values may be variable, in particular may each be variable, in particular temporally variable, and/or dependent on the operation and/or working. Further additionally or alternatively, the identification device may be designed for arrangement, in particular spatial arrangement, on, in particular in, the working apparatus.

Further additionally or alternatively, the images may have, in particular may each have, a recording time stamp, and/or the operational data values may have, in particular may each have, an identification time stamp.

Further additionally or alternatively, the at least one output device may be designed for live outputting, in particular automatic live outputting, or real-time outputting and/or reproduction in each case of at least one of the recorded images with at least one operational data value identified in a manner correlated in time thereto. Additionally or alternatively, the at least one output device may be designed to simultaneously output, in particular automatically simultaneously output, a plurality of the recorded images, in particular arranged spatially next to one another in temporal succession, with a plurality of the operational data values temporally identified therefor, in particular arranged spatially next to one another in temporal succession. In particular, the operational data values may be superimposed on the images, in particular as a temporal profile. Further additionally or alternatively, the at least one output device may have or be a screen and/or a display. Further additionally or alternatively, the at least one output device may be separate, in particular spatially separate, from the working apparatus.

In one development, the drive system is a combustion engine drive system. The identification device is designed or configured for identifying, in particular automatically identifying, the temporal succession of operational data values of the combustion engine drive system.

In particular, the combustion engine drive system cannot be easily operated, in particular may be particularly difficult to operate. The system may therefore be particularly useful.

In particular, the combustion engine drive system may have a combustion engine. Additionally or alternatively, the combustion engine drive system may have an engine control unit, in particular an electrical engine control unit (electronic control unit; abbreviation: ECU). In particular, the identification device may be designed for connection, in particular electrical connection, to the engine control unit.

Additionally or alternatively, the drive system may be an electric motor drive system. The identification device may be designed or configured to identify, in particular automatically identify, a temporal succession of operational data values of the electric motor drive system.

In particular, the electric motor drive system may have an electric motor. Additionally or alternatively, the electric motor drive system may be wired and/or based on a rechargeable battery, in particular may have a rechargeable battery.

In one development of the invention, the operational data values comprise a rotation speed value, in particular rotation speed values, an air flow value, in particular air flow values, a position value, in particular position values, of an operating member, in particular of the operating member and/or of an operating member activatable by a user in a variable manner, or a throttle valve or a throttle cylinder of the drive system, a temperature value, in particular temperature values, a clocking rotation speed value, in particular clocking rotation speed values, an ignition information value, in particular ignition information values, an advance force value, in particular advance force values, and/or a power, current and/or voltage value, in particular power, current and/or voltage values.

In particular, the rotation speed value, in particular the rotation speed values, can or should be in an optimum rotation speed range for optimum operation. Additionally or alternatively, the rotation speed value, in particular the rotation speed values, may be dependent on the air flow value, in particular the air flow values, or the position value, in particular the position values, or the temperature value, in particular the temperature values, or the clocking rotation speed value, in particular the clocking rotation speed values, or the ignition information value, in particular the ignition information values, the advance force value, in particular the advance force values, or the power value, in particular the power values, the current value, in particular the current values, or the voltage value, in particular the voltage values. Further additionally or alternatively, the air flow value, in particular the air flow values, can or should be in an optimum air flow range for optimum operation. Further additionally or alternatively, the air flow value, in particular the air flow values, may be dependent on a position value, in particular position values. Further additionally or alternatively, the air flow value, in particular the air flow values, can or should be in an optimum air flow range for optimum operation. Further additionally or alternatively, the position value, in particular the position values, can or should be in an optimum position range for optimum operation. Further additionally or alternatively, the position value, in particular the position values, of the throttle valve or of the throttle cylinder, if present, can be dependent on the position value, in particular the position values, of the operating member, if present. Further additionally or alternatively, the temperature value, in particular the temperature values, can or should be in an optimum temperature range and/or below an upper temperature limit for optimum operation. In particular, a temperature difference value between the temperature value and an ambient temperature value can or should be in an optimum temperature range and/or below an upper temperature limit for optimum operation. Further additionally or alternatively, the temperature value, in particular the temperature values, may be dependent on operation, in particular operating hours, and/or the rotation speed value, in particular the rotation speed values. Further additionally or alternatively, the clocking rotation speed value, in particular the clocking rotation speed values, can or should be in an optimum clocking rotation speed range and/or above a lower clocking rotation speed limit for optimum operation. Further additionally or alternatively, the clocking rotation speed value, in particular the clocking rotation speed values, can be dependent on the temperature value, in particular the temperature values. Further additionally or alternatively, the advance force value, in particular the advance force values, can or should be in an optimum advance force range for optimum operation. Further additionally or alternatively, the power, current and/or voltage value, in particular the power, current and/or voltage values, can or should be in an optimum power, current and/or voltage range for optimum operation. Further additionally or alternatively, the power, current and/or voltage value, in particular the power, current and/or voltage values, can be dependent on the position value, in particular the position values, of the operating member, if present.

Further additionally or alternatively, the operational data values may comprise the air flow value, the position value of the throttle valve or of the throttle cylinder, if present, and/or the ignition information value in the combustion engine drive system, if present. Additionally or alternatively, the temperature value may be a crankcase temperature value of a crankcase of the combustion engine drive system, if present.

Further additionally or alternatively, the operational data values may comprise the power, current and/or voltage value in the electric motor drive system, if present. Additionally or alternatively, the temperature value may be a rechargeable battery temperature value of a rechargeable battery, in particular of the rechargeable battery, of the electric motor drive system, if present.

In one development of the invention, the system has a determination device, in particular an electrical determination device. The determination device is designed or configured for obtaining, in particular automatically obtaining, in particular obtaining live or obtaining in real time, at least one item of operation information for, in particular optimum, operation of the working apparatus, in particular user activation of the drive system, as a function of or on the basis of the recorded images and/or the identified operational data values, in particular in an apparatus-specific manner. The at least one output device is designed or configured for outputting, in particular automatic and/or optical outputting, in particular live outputting or real-time outputting, of the at least one obtained item of operation information. This makes it possible for the user to operate the working apparatus, in particular in an optimum manner, in particular during working. In detail, this enables ergonomic working for the user and/or an optimum operating state of the working apparatus, in particular of the drive system, and/or an optimum working result. In particular, the determination device may be referred to as an assistance device. Additionally or alternatively, the item of operation information may be referred to as feedback. Further additionally or alternatively, the item of operation information may comprise an item of achievement information or an item of deviation information from the optimum operation or an item of information for achieving optimum operation, in particular in the event of a deviation. Further additionally or alternatively, the determination device may have or be a processor, in particular a CPU. Further additionally or alternatively, the determination device may be separate, in particular spatially separate, from the working apparatus.

In one configuration of the invention, the at least one item of operation information comprises an item of rotation speed, air flow and/or position information, an item of temperature and/or clocking rotation speed information and/or an item of advance force information for optimum operation, in particular operational optimum or optimum power, in particular in an apparatus-specific manner. This makes it possible for the user to operate the working apparatus, in particular the drive system, in an optimum manner.

In one development of the invention, the system has at least one electrical storage device. The at least one storage device is designed or configured for storing, in particular automatically storing, the recorded images and the identified operational data values, and in particular the at least one obtained item of operation information. This makes it possible to reproduce, in particular at a later time or not in real time, in each case at least one of the recorded images with at least one operational data value identified in a manner correlated in time thereto. In particular, the at least one output device may be designed to output, in particular automatically and/or optically output, the stored images and the stored operational data values and, in particular, the at least one item of stored operation information. Additionally or alternatively, the at least one storage device may have or be a hard disk and/or a removable storage medium and/or an electronic storage device, in particular a semiconductor storage device, and/or a magnetic storage device and/or an optical storage device. Further additionally or alternatively, the at least one storage device may be separate, in particular spatially separate, from the working apparatus.

In one development of the invention, the system has a mobile apparatus, in particular an electrical mobile apparatus. The mobile apparatus includes the optical recording device and/or the at least one output device. This enables particularly high user-friendliness. In particular, "mobile" can be referred to as portable or hand-guided, in particular handheld. Additionally or alternatively, the mobile apparatus may have the determination device and/or the at least one storage device, if present. Further additionally or alternatively, the mobile apparatus may be separate, in particular spatially separate, from the working apparatus.

In one configuration of the invention, the mobile apparatus is a smartphone, a tablet computer or a laptop computer. In particular, the smartphone, the tablet computer or the laptop computer may have a user-friendly output device, in particular the user-friendly output device, and/or a user-friendly input device, in particular a keyboard and/or a mouse, and/or a user-friendly combined output/input device, in particular the user-friendly combined output/input device, in particular a touchscreen.

In one development of the invention, the system has a wireless transmission system, in particular an electrical wireless transmission system.

The wireless transmission system is designed or configured for wireless transmission, in particular automatic wireless transmission, of the recorded images from the optical recording device and/or the at least one storage device to the determination device, the at least one storage device and/or the at least one output device.

Additionally or alternatively, the wireless transmission system is designed or configured for wireless transmission, in particular automatic wireless transmission, of the identified operational data values from the identification device and/or the at least one storage device to the determination device, the at least one storage device and/or the at least one output device.

Additionally or alternatively, the wireless transmission system is designed or configured for wireless transmission, in particular automatic wireless transmission, of the at least one obtained item of operation information from the determination device to the at least one storage device and/or the at least one output device.

This enables particularly high user-friendliness.

In particular, the wireless transmission system may be a radio transmission system, in particular a Bluetooth transmission system and/or a WLAN or WiFi transmission system. Additionally or alternatively, one part of the wireless transmission system may be designed for arrangement, in particular spatial arrangement, on, in particular in, the working apparatus.

Further additionally or alternatively, one part, in particular another part, of the wireless transmission system may be designed for arrangement, in particular spatial arrangement, on, in particular in, the optical recording device and/or the at least one output device and/or the determination device and/or the at least one storage device and/or the mobile apparatus.

In one development of the invention, the system comprises the working apparatus.

In one configuration of the invention, the identification device and/or a part, in particular the part, of the wireless transmission system are/is, in particular respectively, a part of the working apparatus or are/is integrated in the working apparatus. In particular, the drive system, in particular the combustion engine drive system if present, may have an engine control unit, in particular the engine control unit and/or electrical engine control unit. The identification device and/or the part of the wireless transmission system may be a part of the engine control unit or may be integrated in the engine control unit.

In one configuration of the invention, the working apparatus is a brush cutter, hedge shears, a motor saw or a cutoff grinder. In particular, the brush cutter may have, as a working tool, at least one movable mowing line, at least one movable plastic blade, at least one movable metal blade and/or a movable metal cutting blade with at least one cutting edge and/or with at least one cutting tooth. Additionally or alternatively, the brush cutter may be designed to work on, in particular cut and/or mow, grass, herbaceous plants, woody undergrowth and/or relatively small shrubs as a workpiece. Further additionally or alternatively, the hedge shears may have, as a working tool, a blade with stationary cutters and movable cutters. Further additionally or alternatively, the hedge shears may be designed to work on, in particular cut, a hedge, a bush and/or strong stalky plants as a workpiece. Further additionally or alternatively, the motor saw may have, as a working tool, a rail with a movable saw chain. Further additionally or alternatively, the motor saw may be designed to work on, in particular saw, trees, in particular tree trunks and/or tree branches, as a workpiece. Further additionally or alternatively, the cutoff grinder may have, as a working tool, a movable grinding disc. Further additionally or alternatively, the cutoff grinder may be designed to work on, in particular grind, wood, metal, stone, concrete and/or ceramic as a workpiece.

The invention also relates to a method, in particular an automatic method, for analyzing or evaluating operation, in particular the operation, or operating, in particular the operating, of a hand-guided working apparatus, in particular of the hand-guided working apparatus, in particular a gardening, forestry and/or construction working apparatus, wherein the working apparatus includes a working tool, in particular the working tool, and a drive system, in particular the drive system and/or a drive system activatable by a user in a variable manner, for driving, in particular automatically driving, the working tool, in particular by means of the system described above. The method comprises the steps: a) recording, in particular automatically recording, a temporal succession, in particular the temporal succession, of images of a working procedure, in particular of the working procedure, or of working, in particular the working, on a workpiece, in particular on the workpiece, using the working tool, in particular by means of the optical recording device described above; b) identifying, in particular automatically identifying, a temporal succession, in particular the temporal succession, of operational data values of the drive system during or at the same time as recording of the temporal succession of images, in particular by means of the identification device described above; c) outputting, in particular automatically and/or simultaneously and/or optically outputting, in each case at least one of the recorded images together with at least one operational data value identified in a manner correlated in time thereto or identified simultaneously or at the same time, in particular by means of the at least one output device described above.

The method may enable the same advantages as the system described above.

In particular, step a) may comprise: recording the temporal succession of images of the working apparatus, in particular of the working tool, and/or of the workpiece and/or of the user, in particular during working. Additionally or alternatively, step c) may comprise: live outputting or real-time outputting and/or reproduction of in each case at least one of the recorded images with at least one identified operational data value correlated in time thereto. Further additionally or alternatively, step c) may comprise: simultaneously outputting a plurality of the recorded images, in particular arranged spatially next to one another in temporal succession, with a plurality of the operational data values temporally identified therefor, in particular arranged spatially next to one another in temporal succession. In particular, the operational data values may be superimposed on the images, in particular as a temporal profile.

In one development of the invention, the method comprises the step: obtaining, in particular automatically obtaining and/or obtaining live or obtaining in real time, at least one item of operation information, in particular the item of operation information, for, in particular optimum, operation of the working apparatus, in particular user activation of the drive system, as a function of or on the basis of the recorded images and/or the identified operational data values, in particular in an apparatus-specific manner, in particular by means of the determination device described above. Step c) includes: outputting, in particular automatic and/or optical outputting and/or live outputting or real-time outputting, of the at least one obtained item of operation information, in particular by means of the at least one output device described above.

In one development of the invention, the method comprises the step: storing, in particular automatically storing, the recorded images and the identified operational data values, and in particular the at least one obtained item of operation information, in particular by means of the at least one storage device described above. In particular, step c) may comprise: outputting, in particular automatically and/or optically outputting, the stored images and the stored operational data values, and in particular the at least one item of stored operation information, in particular by means of the at least one output device described above.

In one development of the invention, the method comprises the step: wireless transmission, in particular automatic wireless transmission, of the recorded images from the optical recording device and/or the at least one storage device to the determination device, the at least one storage device and/or the at least one output device, in particular by means of the wireless transmission system described above. Additionally or alternatively, the method comprises the step: wireless transmission, in particular automatic wireless transmission, of the identified operational data values from the identification device and/or the at least one storage device to the determination device, the at least one storage device and/or the at least one output device, in particular by means of the wireless transmission system described above. Additionally or alternatively, the method comprises the step: wireless transmission, in particular automatic wireless transmission, of the at least one obtained item of operation information from the determination device to the at least one storage device and/or the at least one output device, in particular by means of the wireless transmission system described above.

In particular, the wireless transmission may be radio transmission, in particular Bluetooth transmission and/or WLAN or WiFi transmission.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 7 show a system 1 for analyzing operation of a hand-guided working apparatus 51, in particular a gardening, forestry and/or construction working apparatus. The working apparatus 51 has a working tool 52 and a drive system 53, in particular a drive system activatable by a user in a variable manner, for driving the working tool 52. The system 1 has an optical recording device 2, an identification device 3 and at least one output device 4. The optical recording device 2 is designed to record a temporal succession of images BI of a working procedure on a workpiece 101 using the working tool 52. The identification device 3 is designed to identify a temporal succession of operational data values BDW of the drive system 53 during recording of the temporal succession of images BI. The at least one output device 4 is designed to output in each case at least one of the recorded images BI together with at least one operational data value BDW identified in a manner correlated in time thereto.

FIGS. 1 to 7 also show a method for analyzing the operation of the hand-guided working apparatus 51, in particular by means of the system 1. The method has the steps: a) recording the temporal succession of images BI of the working procedure on the workpiece 101 using the working tool 52, in particular by means of the optical recording device 2; b) identifying the temporal succession of operational data values BDW of the drive system 53 during recording of the temporal succession of images BI, in particular by means of the identification device 3; c) outputting in each case at least one of the recorded images BI together with at least one operational data value BDW identified in a manner correlated in time thereto, in particular by means of the at least one output device 4.

Figure 2:
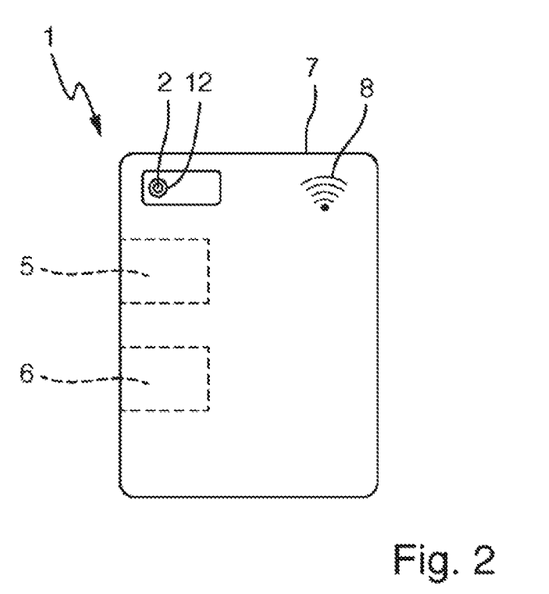
FIG. 2 shows an optical recording device of the system from FIG. 1.

In the exemplary embodiment shown, the optical recording device 2 is a camera 12, as shown in FIG. 2.

Figure 1:
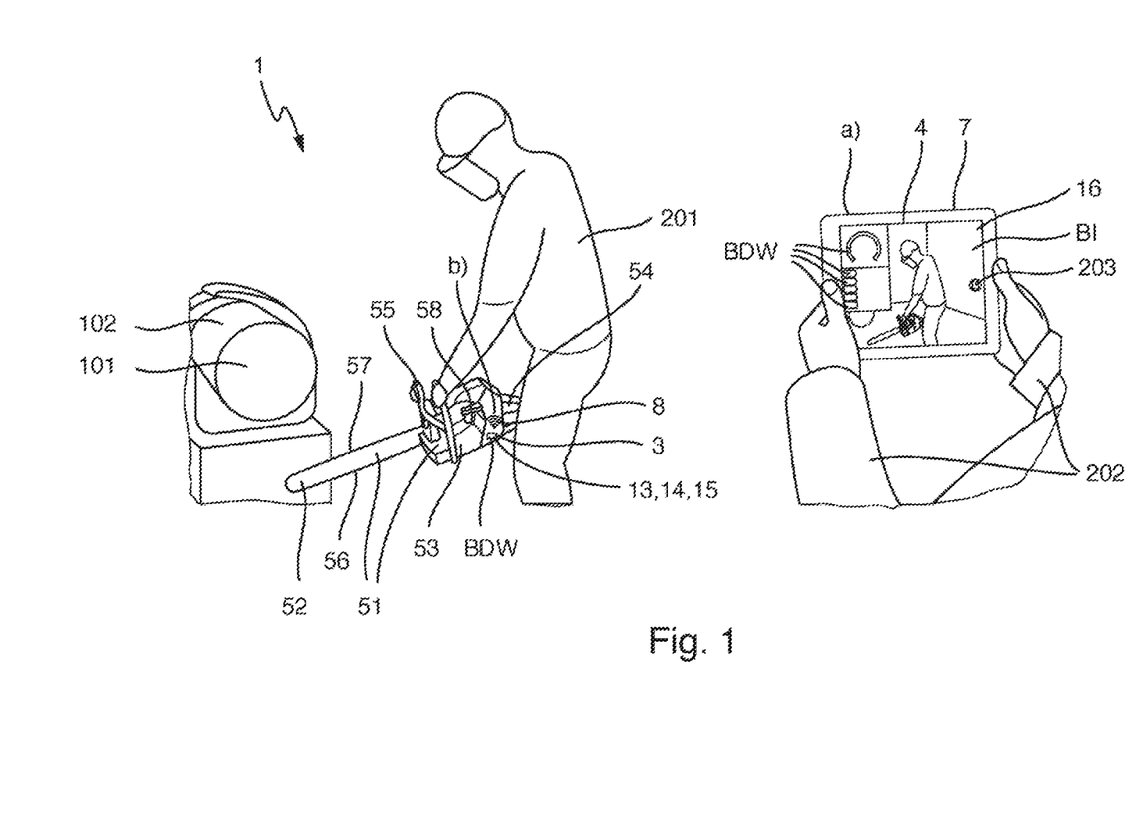
FIG. 1 shows a system according to the invention and a method according to the invention.

In addition, in the exemplary embodiment shown, the identification device 3 has at least one sensor 13, 14, 15, as shown in FIG. 1. The at least one sensor 13, 14, 15 is designed to identify the temporal succession of operational data values BDW of the drive system 53.

Furthermore, in the exemplary embodiment shown, the at least one output device 4 is a touchscreen 16, as shown in FIG. 1.

In addition, in the exemplary embodiment shown, the system 1 has only a single output device 4. In alternative exemplary embodiments, the system may have at least two output devices.

In detail, the system 1 has a mobile apparatus 7. In the exemplary embodiment shown, the mobile apparatus 7 has the optical recording device 2 and the at least one output device 4. In alternative exemplary embodiments, the mobile apparatus may have, in particular either, the optical recording device or the at least one output device.

In particular, the optical recording device 2 is arranged, in particular spatially, on a rear side of the mobile apparatus 7, as shown in FIG. 2. The at least one output device 4 is arranged, in particular spatially, on a front side of the mobile apparatus 7 opposite the rear side, as shown in FIG. 1.

In the exemplary embodiment shown, the mobile apparatus 7 is a tablet computer. In alternative exemplary embodiments, the mobile apparatus may be a smartphone or a laptop computer.

Furthermore, the system 1 has the working apparatus 51.

In the exemplary embodiment shown, the working apparatus 51 is a motor saw 55. In alternative exemplary embodiments, the working apparatus may be a brush cutter, hedge shears or a cutoff grinder.

In detail, the working tool 52 is a rail 56 with a movable saw chain 57.

In addition, the workpiece 101 is a tree trunk 102.

Furthermore, the working apparatus 51 has a user-activatable operating member 54 in the form of an operating lever (trigger), for, in particular variable, user activation of the drive system 53, as shown in FIG. 1.

In the exemplary embodiment shown, the drive system 53 is a combustion engine drive system 58. The identification device 3 is designed to identify the temporal succession of operational data values BDW of the combustion engine drive system 58. In alternative exemplary embodiments, the drive system may be an electric motor drive system.

In addition, in the exemplary embodiment shown, the operational data values BDW have rotation speed values DZW, air flow values LMW, temperature values TW, clocking rotation speed values ADW. In alternative exemplary embodiments, the operational data values may have, in particular either, the rotation speed value or the air flow value or the temperature value or the clocking rotation speed value. Additionally or alternatively, the operational data values may have, in alternative exemplary embodiments, a position value of the user-activatable operating member or a throttle valve or a throttle cylinder of the drive system, an ignition information value, an advance force value and/or a power, current and/or voltage value.

In detail, the identification device 3 has a rotation speed sensor 13. The rotation speed sensor 13 is designed to identify the temporal succession of rotation speed values DZW of the drive system 53. The identification device 3 also has an air flow sensor 14. The air flow sensor 14 is designed to identify the temporal succession of air flow values LMW of the drive system 53. The identification device 3 also has a temperature sensor 15. The temperature sensor 15 is designed to identify the temporal succession of temperature values TW of the drive system 53.

The system 1 also has a determination device 5, as shown in FIG. 2. In the exemplary embodiment shown, the determination device 5 is designed to obtain at least one item of operation information BHW for, in particular optimum, operation of the working apparatus 51, in particular user activation of the drive system 53, as a function of the identified operational data values BDW. In alternative exemplary embodiments, the determination device may be additionally or alternatively designed to obtain at least one item of operation information for, in particular optimum, operation of the working apparatus, in particular user activation of the drive system, as a function of the recorded images. The at least one output device 4 is designed to output the at least one obtained item of operation information BHW.

In the exemplary embodiment shown, the mobile apparatus 7 has the determination device 5.

In addition, the method has the step: obtaining the at least one item of operation information BHW for, in particular optimum, operation of the working apparatus 51, in particular user activation of the drive system 53, as a function of the identified operational data values BDW, in particular by means of the determination device 5. In alternative exemplary embodiments, the method may additionally or alternatively have the step: obtaining at least one item of operation information for, in particular optimum, operation of the working apparatus, in particular user activation of the drive system, as a function of the recorded images, in particular by means of the determination device. Step c) comprises: outputting the at least one obtained item of operation information BHW, in particular by means of the at least one output device 4.

Figure 6:
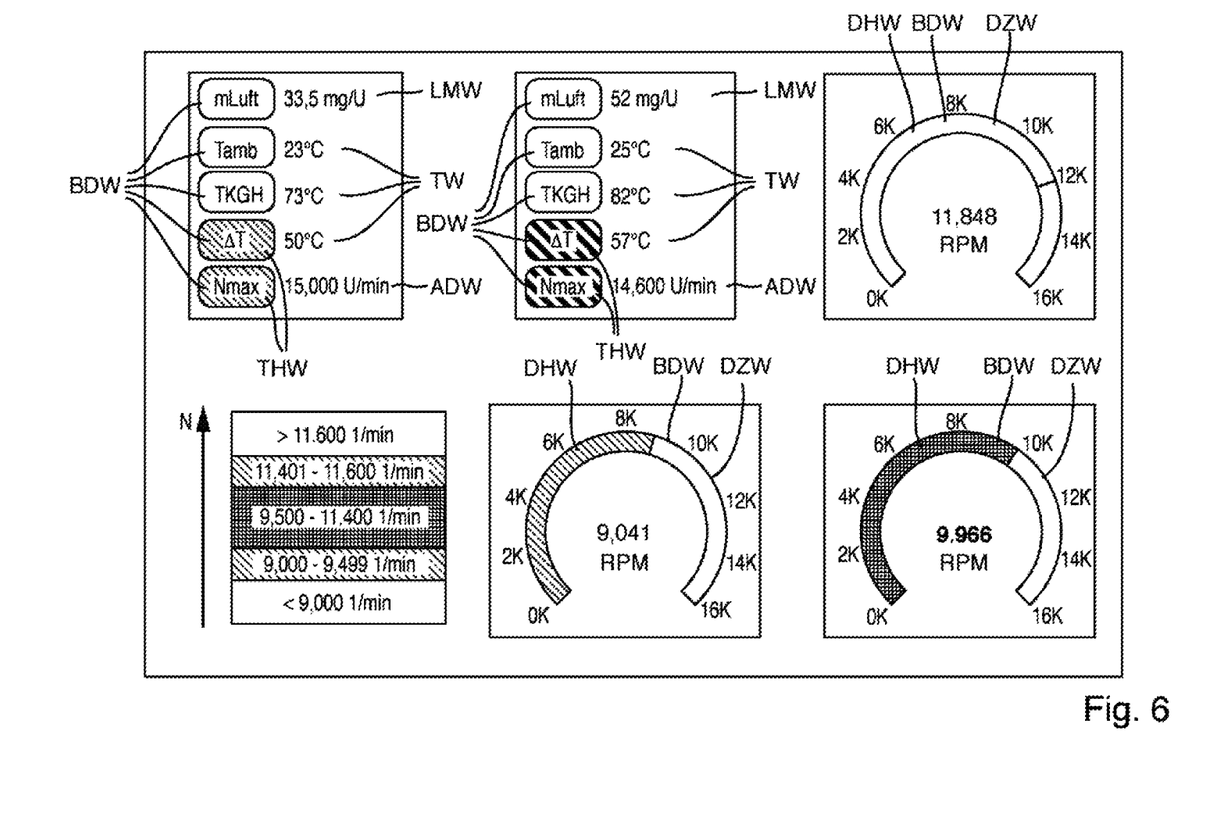
FIG. 6 shows items of operation information relating to the system from FIG. 1 and the method from FIG. 1.

In the exemplary embodiment shown, the at least one item of operation information BHW has an item of rotation speed, air flow and/or position information DHW, in particular an item of rotation speed information DHW, and an item of temperature and/or clocking rotation speed information THW for optimum operation, as shown in FIG. 6. In alternative exemplary embodiments, the at least one item of operation information may have, in particular either, the item of rotation speed, air flow and/or position information or the item of temperature and/or clocking rotation speed information. Additionally or alternatively, the at least one item of operation information may have an item of advance force information for optimum operation in alternative exemplary embodiments.

The system 1 also has at least one storage device 6, as shown in FIG. 2. The at least one storage device 6 is designed to store the recorded images BI and the identified operational data values BDW, and in particular the at least one obtained item of operation information BHW.

In the exemplary embodiment shown, the system 1 has only a single storage device 6. In alternative exemplary embodiments, the system may have at least two storage devices.

In detail, the mobile apparatus 7 has the at least one storage device 6.

The method also has the step: storing the recorded images BI and the identified operational data values BDW, and in particular the at least one obtained item of operation information BHW, in particular by means of the at least one storage device 6.

The system 1 also has a wireless transmission system 8, as shown in FIGS. 1 and 2.

In the exemplary embodiment shown, the wireless transmission system 8 is designed to wirelessly transmit the identified operational data values BDW from the identification device 3 to the determination device 5, the at least one storage device 6 and the at least one output device 4. In alternative exemplary embodiments, the wireless transmission system may be designed to wirelessly transmit the identified operational data values from the identification device and/or the at least one storage device to the determination device, the at least one storage device and/or the at least one output device. Additionally or alternatively, in alternative exemplary embodiments, the wireless transmission system may be designed to wirelessly transmit the recorded images from the optical recording device and/or the at least one storage device to the determination device, the at least one storage device and/or the at least one output device. Further additionally or alternatively, in alternative exemplary embodiments, the wireless transmission system can be designed to wirelessly transmit the at least one obtained item of operation information from the determination device to the at least one storage device and/or the at least one output device.

In addition, in the exemplary embodiment shown, the wireless transmission system 8 is a radio transmission system.

In detail, one part of the wireless transmission system 8 is a part of the mobile apparatus 7 or is integrated in the mobile apparatus 7.

Furthermore, the identification device 3 and one part, in particular another part, of the wireless transmission system 8 are, in particular each, a part of the working apparatus 51 or are integrated in the working apparatus 51.

In particular, the drive system 53, in particular the combustion engine drive system 58, has an engine control unit. The identification device and the part of the wireless transmission system 8 are, in particular each, a part of the engine control unit or are integrated in the engine control unit.

The method also has the step: wireless transmission, in particular radio transmission, of the identified operational data values BDW from the identification device 3 to the determination device 5, the at least one storage device 6 and the at least one output device 4, in particular by means of the wireless transmission system 8. In alternative exemplary embodiments, the method may have the step: wireless transmission, in particular radio transmission, of the identified operational data values from the identification device and/or the at least one storage device to the determination device, the at least one storage device and/or the at least one output device, in particular by means of the wireless transmission system. Additionally or alternatively, in alternative exemplary embodiments, the method may have the step: wireless transmission, in particular radio transmission, of the recorded images from the optical recording device and/or the at least one storage device to the determination device, the at least one storage device and/or the at least one output device, in particular by means of the wireless transmission system. Further additionally or alternatively, in alternative exemplary embodiments, the method may have the step: wireless transmission, in particular radio transmission, of the at least one obtained item of operation information from the determination device to the at least one storage device and/or the at least one output device, in particular by means of the wireless transmission system.

In FIG. 1, a user 201 operates the working apparatus 51. A holder 202 holds the optical recording device 2 and the at least one output device 4, in particular the mobile apparatus 7.

Figure 3:
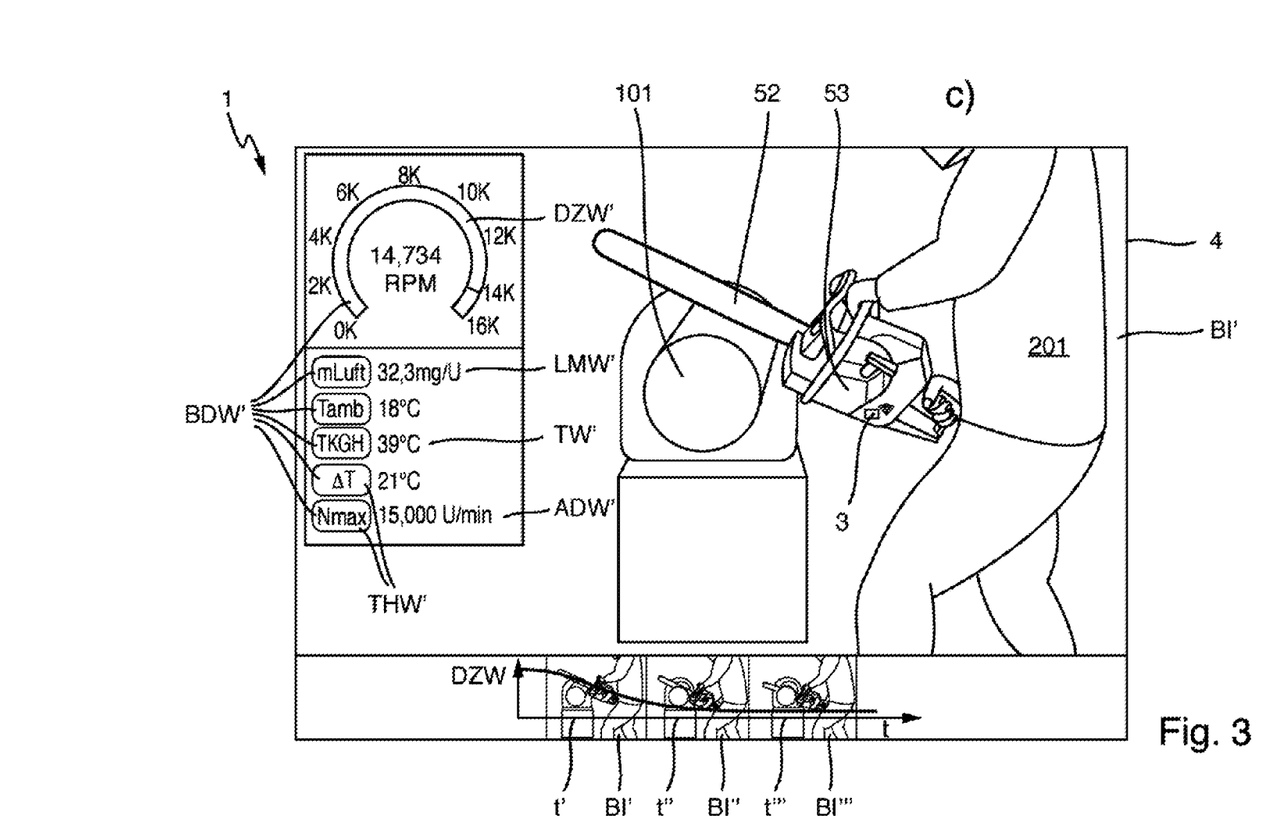
FIG. 3 shows an output device of the system from FIG. 1 and outputting, in the method from FIG. 1, of an image recorded at a first time with at least one operational data value identified in a manner correlated in time thereto.
Figure 4:
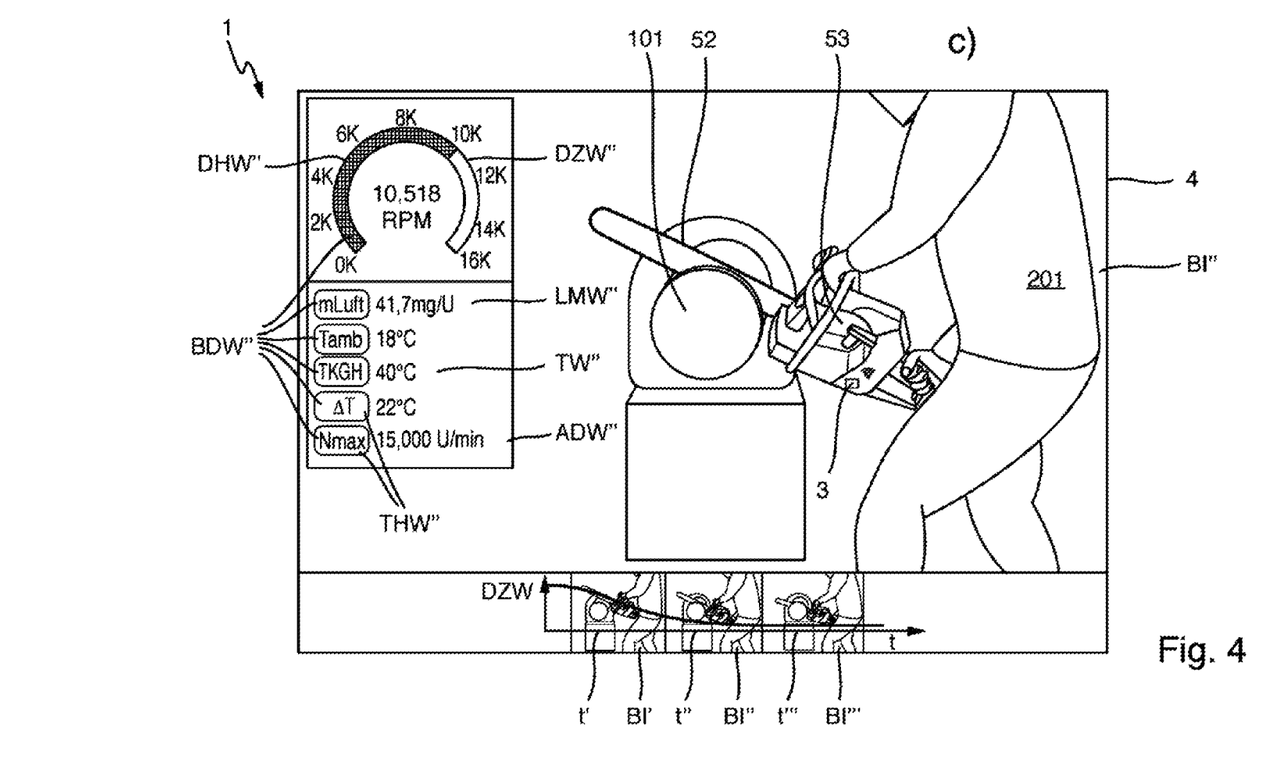
FIG. 4 shows the output device from FIG. 3 and the outputting, from FIG. 3, of an image recorded at a second time temporally after the first time with at least one operational data value identified in a manner correlated in time thereto.
Figure 5:
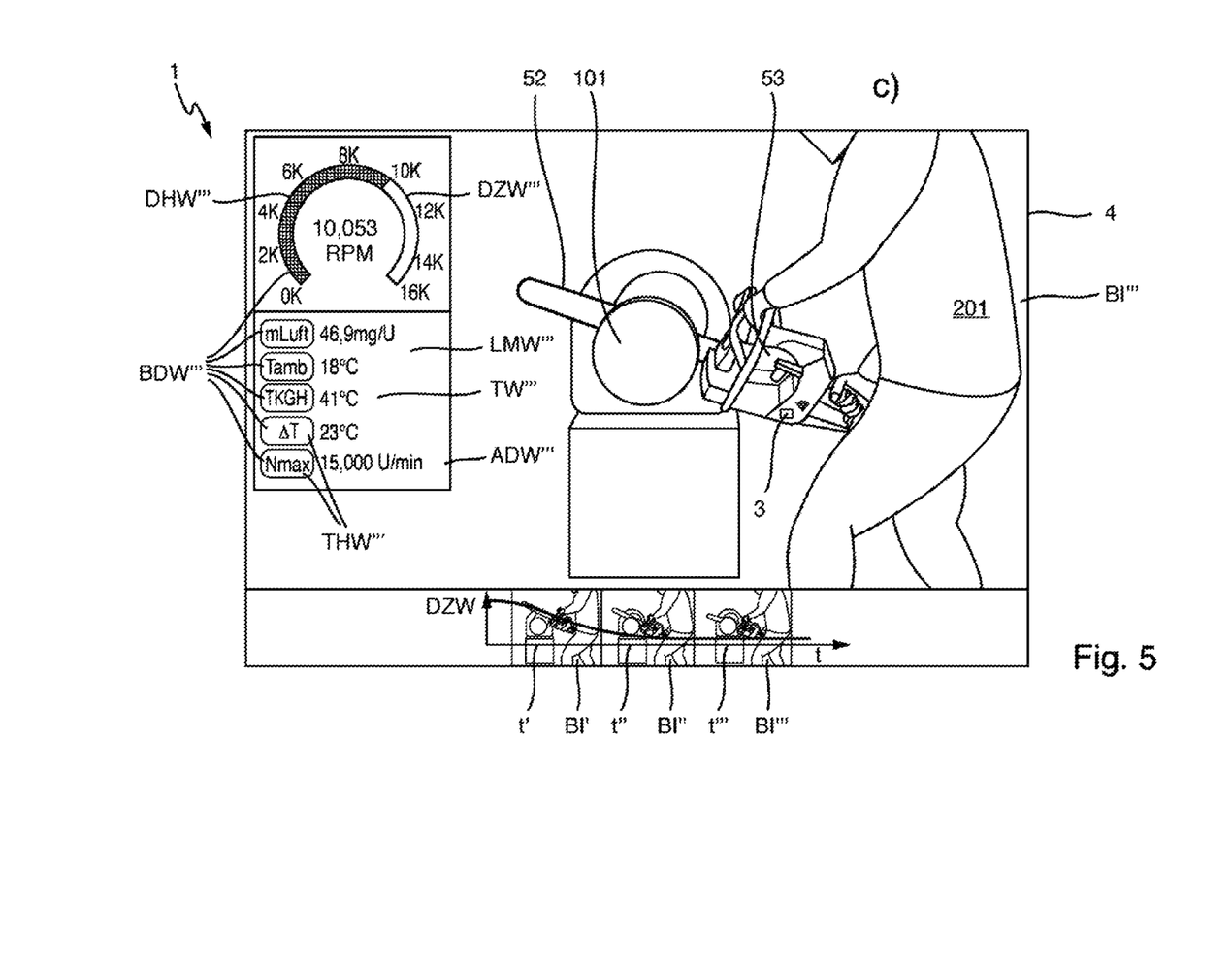
FIG. 5 shows the output device from FIG. 3 and the outputting, from FIG. 3, of an image recorded at a third time temporally after the second time with at least one operational data value identified in a manner correlated in time thereto.

The optical recording device 2 records a temporal succession, in particular the temporal succession, of images BI of the working apparatus 51, in particular the working tool 52, the workpiece 101 and the user 201, temporally before the working procedure in FIG. 1 and during the working procedure in FIGS. 3 to 5, in particular in step a).

The identification device 3 identifies a temporal succession, in particular the temporal succession, of operational data values BDW of the drive system 53 during recording of the temporal succession of images BI, in particular in step b).

In FIG. 1, the at least one output device 4 outputs in each case at least one of the recorded images BI together with at least one operational data value BDW identified in a manner correlated in time thereto in real time, and in particular the at least one obtained item of operation information BHW, in particular in step c).

In order to start and temporally later stop the storage of the recorded images BI and the identified operational data values BDW, and in particular the at least one obtained item of operation information BHW, the holder 202 presses a recording button 203 on the touchscreen 4.

In FIGS. 3 to 5, the at least one output device 4 temporally subsequently reproduces in each case at least one of the recorded, and in particular stored, images BI together with at least one operational data value BDW which is identified in a manner coordinated in time thereto and is in particular stored, and in particular the at least one obtained, and in particular stored, item of operation information BHW, in particular in step c).

At a first time t1 shown in FIG. 3, the user 201 starts the working procedure on the workpiece 101 using the working tool 52. In the exemplary embodiment shown, the user 201 places the working apparatus 51 in the form of the motor saw 55 with the working tool 52 in the form of the rail 56 with the movable saw chain 57 on the workpiece 101 in the form of the tree trunk 102, in particular on a circumference. In this case, the temperature value TW' is 39° C. (degrees Celsius) and is therefore 21° C. above an ambient temperature value Tamb of 18° C. identified by means of the identification device 3. The temperature value TW', in particular a value of the temperature difference, is therefore, in particular clearly, below an upper temperature limit and is therefore optimum. The drive system 53, in particular the combustion engine drive system 58, in particular its engine control unit, therefore enables a clocking rotation speed value ADW', in particular a maximum clocking rotation speed value, of 15,000 revolutions per minute (abbreviation: rpm or U/min). The temperature difference value and the clocking rotation speed value ADW' are therefore not highlighted in color as the item of temperature and/or clocking rotation speed information THW'. Optimally, in particular for placing the apparatus on the circumference, the rotation speed value DZW' of 14,734 revolutions per minute (abbreviation: rpm or U/min) is virtually at the clocking rotation speed value ADW' of 15,000 rpm.

At a second time t2 which is temporally after the first time and is shown in FIG. 4, the user 201 with the working tool 52 in the form of the rail 56 with the movable saw chain 57 is halfway between the circumference and the center of the workpiece 101 in the form of the tree trunk 102. In this case, the temperature value TW" is 40° C. and is therefore 22° C. above the ambient temperature value Tamb of 18° C. The temperature value TW", in particular a value of the temperature difference, is therefore, in particular clearly, still below the upper temperature limit and is therefore optimum. The drive system 53, in particular the combustion engine drive system 58, in particular its engine control unit, therefore still enables the clocking rotation speed value ADW", in particular the maximum clocking rotation speed value, of 15,000 rpm. The temperature difference value and the clocking rotation speed value ADW" are therefore not highlighted in color as the item of temperature and/or clocking rotation speed information THW". Optimally, in particular for sawing the tree trunk 102, the rotation speed value DZW" of 10,518 rpm is in an optimum rotation speed range of 9500 to 11,400 l/min, as shown in FIG. 6. The rotation speed value DZW" is therefore highlighted in green as the item of rotation speed, air flow and/or position information DHW", as indicated by chequered hatching in FIG. 4.

At a third time t3 which is temporally after the second time and is shown in FIG. 5, the user 201 with the working tool 52 in the form of the rail 56 with the movable saw chain 57 is at the center of the workpiece 101 in the form of the tree trunk 102. In this case, the temperature value TW' is 41° C. and is therefore 23° C. above the ambient temperature value Tamb of 18° C. The temperature value TW'", in particular a value of the temperature difference, is therefore, in particular clearly, still below the upper temperature limit and is therefore optimum. The drive system 53, in particular the combustion engine drive system 58, in particular its engine control unit, therefore still enables the clocking rotation speed value ADW'", in particular the maximum clocking rotation speed value, of 15,000 rpm. The temperature difference value and the clocking rotation speed value ADW'" are therefore not optically highlighted as the item of temperature and/or clocking rotation speed information THW'". Optimally, in particular for sawing the tree trunk 102, the rotation speed value DZW'" of 10,053 rpm is in the optimum rotation speed range of 9500 to 11,400 l/min. The rotation speed value DZW'" is therefore highlighted in green as the item of rotation speed, air flow and/or position information DHW'", as indicated by chequered hatching in FIG. 5.

If the temperature value TW, in particular a value of the temperature difference, is below, in particular just below, the upper temperature limit and is therefore no longer optimum, the drive system 53, in particular the combustion engine drive system 58, in particular its engine control unit, should no longer enable the clocking rotation speed value ADW, in particular the maximum clocking rotation speed value, of 15,000 rpm but rather should reduce it, in particular just before this. The temperature difference value and the clocking rotation speed value ADW are therefore highlighted in yellow as the item of temperature and/or clocking rotation speed information THW, as indicated at the top left of FIG. 6 by hatching with thin lines from the top left to the bottom right. At the top left of FIG. 6, the temperature value TW is 73° C. and is therefore 50° C. above an ambient temperature value Tamb of 23° C.

If the temperature value TW, in particular a value of the temperature difference, reaches or exceeds the upper temperature limit and is therefore no longer optimum, the drive system 53, in particular the combustion engine drive system 58, in particular its engine control unit, no longer enables the clocking rotation speed value ADW, in particular the maximum clocking rotation speed value, of 15,000 rpm but rather reduces the clocking rotation speed value ADW, in particular the maximum clocking rotation speed value, to 14,600 rpm. The temperature difference value and the clocking rotation speed value ADW are therefore highlighted in red as the item of temperature and/or clocking rotation speed information THW, as indicated at the top center of FIG. 6 by hatching with thick lines from the top left to the bottom right. At the top center of FIG. 6, the temperature value TW is 82° C. and is therefore 57° C. above an ambient temperature value Tamb of 25° C.

In particular, if the temperature difference value is below 50° C., the temperature difference value and the clocking rotation speed value ADW are not highlighted in color as the item of temperature and/or clocking rotation speed information THW. If the temperature difference value is between 50° C. and 55° C., the temperature difference value and the clocking rotation speed value ADW are highlighted in yellow as the item of temperature and/or clocking rotation speed information THW. If the temperature difference value is above 55° C., the temperature difference value and the clocking rotation speed value ADW are highlighted in red as the item of temperature and/or clocking rotation speed information THW.

If the rotation speed value DZW is in the optimum rotation speed range of 9500 to 11,400 l/min, the rotation speed value DZW is highlighted in green as the item of rotation speed, air flow and/or position information DHW, as indicated at the bottom right of FIG. 6 by chequered hatching. At the bottom right of FIG. 6, the rotation speed value DZW is 9966 rpm.

If the rotation speed value DZW is in a less optimum rotation speed range of 9000 to 9499 l/min and/or of 11,401 to 11,600 l/min, the rotation speed value DZW is highlighted in yellow as the item of rotation speed, air flow and/or position information DHW, as indicated at the bottom center of FIG. 6 by hatching with thin lines from the top left to the bottom right. At the bottom center of FIG. 6, the rotation speed value DZW is 9041 rpm.

If the rotation speed value DZW is in a non-optimum rotation speed range of below 9000 l/min and/or above 11,600 l/min, the rotation speed value DZW is not highlighted in color as the item of rotation speed, air flow and/or position information DHW, as indicated at the top right of FIG. 6. At the top right of FIG. 6, the rotation speed value DZW is 11,848 rpm.

In addition, the at least one output device 4 simultaneously outputs a plurality of the recorded images BI', BI", BI''', in particular arranged spatially next to one another in temporal succession t1, t2, t3, together with a plurality of the operational data values BDW', BDW", BDW''' temporally identified therefor, the rotation speed values DZW', DZW", DZW''' in the exemplary embodiment shown, in particular arranged spatially next to one another in temporal succession t1, t2, t3, in particular in step c), as shown at the bottom of FIGS. 3 to 5. This makes it possible to analyze a duration of the working procedure.

Figure 7:
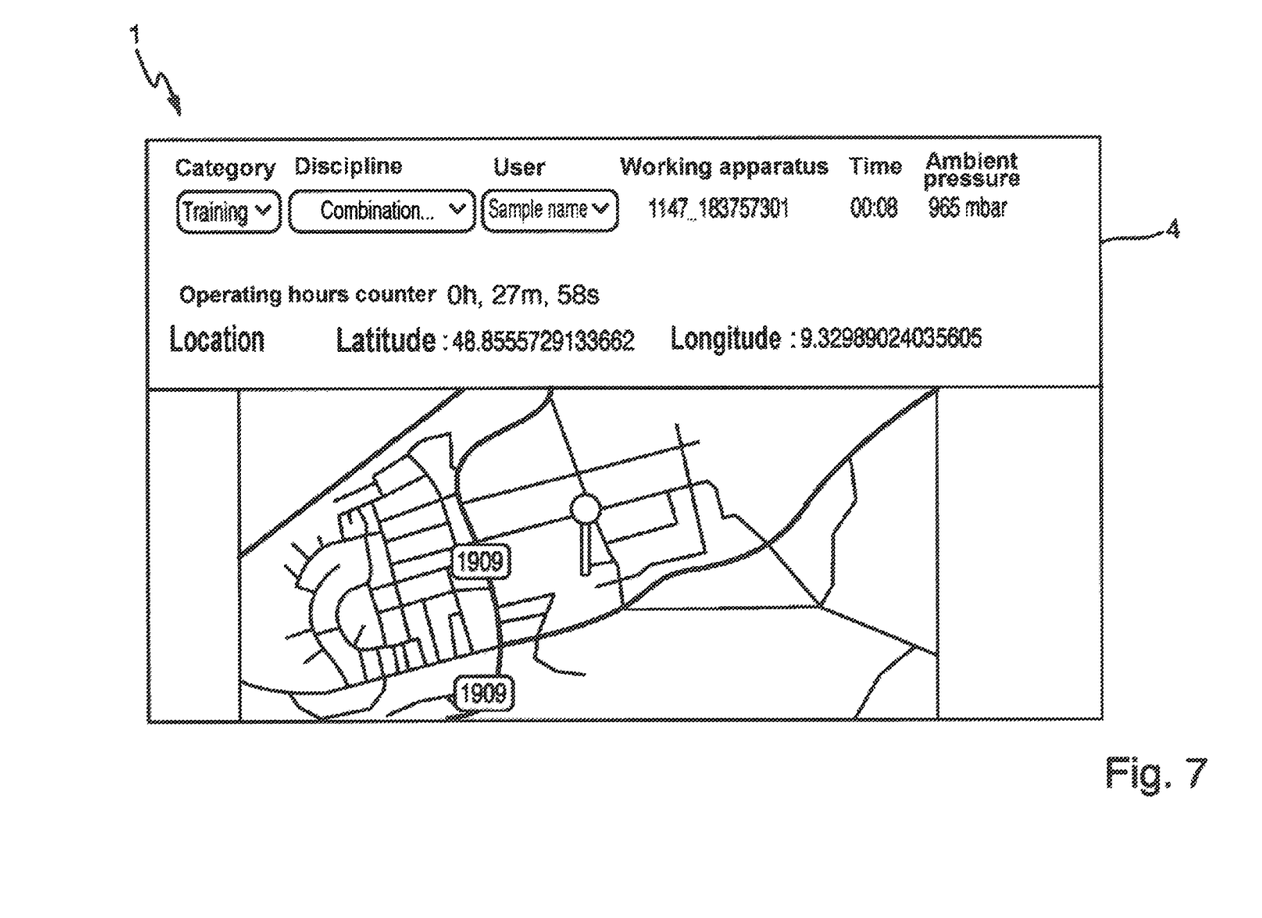
FIG. 7 shows further functions of the system from FIG. 1 and of the method from FIG. 1.

In addition, the system 1 is designed for or the method has the step of: assigning the stored images BI and the stored operational data values BDW, and in particular the at least one item of stored operation information BHW, to a category and/or a discipline and/or a username and/or a working apparatus, in particular a specific working apparatus, and/or a storage time and/or an ambient pressure and/or an operating time and/or a location or a position, as shown in FIG. 7.

This makes it possible to temporally subsequently find the stored images BI and the stored operational data values BDW, and in particular the at least one item of stored operation information BHW, in a particularly simple manner, in particular by means of filtering.

In particular, the system 1 may have an ambient pressure identification device, in particular of the identification device 3 and/or of the working apparatus 51, an operating hours counter, in particular of the identification device 3 and/or of the working apparatus 51, a calibration program status identification device, in particular of the identification device 3 and/or of the working apparatus 51, a position identification device, in particular of the mobile apparatus 7, and/or a microphone, in particular of the mobile apparatus 7.

As the exemplary embodiments shown and explained above make clear, the invention provides an advantageous system for analyzing operation of a hand-guided working apparatus and an advantageous method for analyzing operation of a hand-guided working apparatus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for analysis of operation of a hand-guided working apparatus, wherein the working apparatus includes a working tool and a drive system for driving the working tool, the system, comprising:
   an optical recording device configured for recording a temporal succession of images of a working procedure on a workpiece using the working tool;
   an identification device configured for identifying a temporal succession of operational data values of the drive system during recording of the temporal succession of images; and
   at least one output device configured for outputting in each case at least one of the recorded images together with at least one identified operational data value correlated in time thereto,
   wherein the drive system is a combustion engine drive system and/or an electric motor drive system, and
   the identification device is configured for identifying the temporal succession of operational data values of the combustion engine drive system and/or the electric motor drive system.

2. The system according to claim 1, wherein
   the operational data values comprise a rotation speed value, an air flow value, a position value of an operating member or of a throttle valve or a throttle cylinder of the drive system, a temperature value, a clocking rotation speed value, an ignition information value, an advance force value, and/or a power, current and/or voltage value.

3. The system according to claim 2, wherein
   the position value of the operating member is a position value of an operating member activatable by a user in a variable manner.

4. The system according to claim 1, further comprising:
   a determination device configured for obtaining at least one item of operation information for operation of the working apparatus as a function of the recorded images and/or the identified operational data values, and
   wherein the at least one output device is configured for outputting the at least one obtained item of operation information.

5. The system according to claim 4, wherein
   the at least one item of operation information comprises an item of rotation speed, air flow and/or position information, an item of temperature and/or clocking rotation speed information and/or an item of advance force information for an optimum operation.

6. The system according to claim 1, further comprising:
   at least one storage device configured for storing the recorded images and the identified operational data values.

7. The system according to claim 1, further comprising:
   a mobile apparatus including the optical recording device and/or the at least one output device.

8. The system according to claim 7, wherein
   the mobile apparatus is a smartphone, a tablet computer or a laptop computer.

9. The system according to claim 1, further comprising:
   a wireless transmission system configured for wireless transmission of one or more of:
   (i) the recorded images from the optical recording device and/or at least one storage device to a determination device, the at least one storage device and/or the at least one output device,
   (ii) the identified operational data values from the identification device and/or the at least one storage device to the determination device, the at least one storage device and/or the at least one output device, and (iii) at least one obtained item of operation information from the determination device to the at least one storage device and/or the at least one output device.

10. The system according to claim 1, further comprising the working apparatus.

11. The system according to claim 10, wherein the identification device and/or a part of a wireless transmission system is a part of the working apparatus.

12. The system according to claim 10, wherein the working apparatus is a brush cutter, hedge shears, a motor saw or a cutoff grinder.

13. The system according to claim 1, wherein the drive system is a drive system activatable by a user in a variable manner.

14. The system according to claim 1, further comprising:
a determination device configured for obtaining at least one item of operation information for operation of the working apparatus as a function of the recorded images and/or the identified operational data values, and
at least one storage device configured for storing the at least one obtained item of operation information.

15. A method for analysis of operation of a hand-guided working apparatus, wherein the working apparatus includes a working tool and a drive system for driving the working tool, the method comprising the steps of:

a) recording a temporal succession of images of a working procedure on a workpiece using the working tool;

b) identifying a temporal succession of operational data values of the drive system during recording of the temporal succession of images;

c) outputting in each case at least one of the recorded images together with at least one detected operational data value correlated in time thereto, wherein the drive system is a combustion engine drive system and/or an electric motor drive system, and
the identifying step (b) identifies the temporal succession of operational data values of the combustion engine drive system and/or the electric motor drive system.

16. The method according to claim 15, further comprising the steps of:
obtaining at least one item of operation information for operation of the working apparatus as a function of the recorded images and/or the identified operational data values; and
wherein the step c) includes: outputting of the at least one obtained item of operation information.

17. The method according to claim 15, further comprising the step of:
storing the recorded images and the identified operational data values.

18. The method according to claim 15, further comprising one or more of the steps of:
wirelessly transmitting the recorded images from an optical recording device and/or at least one storage device to a determination device, the at least one storage device and/or at least one output device,
wirelessly transmitting the identified operational data values from an identification device and/or the at least one storage device to the determination device, the at least one storage device and/or the at least one output device, and
wirelessly transmitting at least one obtained item of operation information from the determination device to the at least one storage device and/or the at least one output device.

19. The method according to claim 15, wherein the drive system is a drive system activatable by a user in a variable manner.

* * * * *